United States Patent
Hu et al.

(10) Patent No.: US 11,174,754 B1
(45) Date of Patent: Nov. 16, 2021

(54) THERMAL BRIDGE FOR CONNECTING SECTIONS WITH A LARGE TEMPERATURE DIFFERENTIAL UNDER HIGH-PRESSURE CONDITIONS

(71) Applicant: Solar Turbines Incorporated, San Diego, CA (US)

(72) Inventors: Gusheng Hu, San Diego, CA (US); Kevin K. Hirako, Chula Vista, CA (US); Stephan C. Wintner, Issaquah, WA (US); John F. Lockyer, San Diego, CA (US); Charles C. Cornelius, Las Vegas, NV (US); Robert J. Ahrens, San Diego, CA (US); Olivier J. Lamicq, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 0 days.

(21) Appl. No.: 17/003,116

(22) Filed: Aug. 26, 2020

(51) Int. Cl.
*F01D 25/12* (2006.01)

(52) U.S. Cl.
CPC .......... *F01D 25/12* (2013.01); *F05D 2220/30* (2013.01); *F05D 2260/20* (2013.01)

(58) Field of Classification Search
CPC ........ F01D 25/12; F01D 25/14; F01D 25/145; F01D 25/24; F01D 9/00; F05D 2220/32; F05D 2260/20
See application file for complete search history.

(56) References Cited

U.S. PATENT DOCUMENTS

| | | | |
|---|---|---|---|
| 4,262,484 A | 4/1981 | Jubb et al. | |
| 4,364,717 A | 12/1982 | Schippers et al. | |
| 4,772,033 A * | 9/1988 | Nash | F02K 1/805 |
| | | | 239/265.35 |
| 5,482,429 A * | 1/1996 | Penda | F01D 21/045 |
| | | | 415/9 |
| 6,059,524 A * | 5/2000 | Costa | F01D 21/045 |
| | | | 415/9 |
| 6,860,108 B2 * | 3/2005 | Soechting | F01D 9/023 |
| | | | 60/39.37 |
| 7,641,442 B2 * | 1/2010 | Denece | F01D 25/12 |
| | | | 415/173.1 |
| 8,347,636 B2 | 1/2013 | Butkiewicz et al. | |
| 8,613,591 B2 * | 12/2013 | Barnett | F02K 3/06 |
| | | | 415/169.2 |
| 8,672,609 B2 * | 3/2014 | Lussier | F01D 25/243 |
| | | | 415/9 |
| 8,899,917 B2 | 12/2014 | Bajusz et al. | |
| 9,533,454 B2 * | 1/2017 | Konigs | F01D 11/122 |
| 10,458,721 B2 | 10/2019 | Laughlin et al. | |
| 2016/0265549 A1 | 9/2016 | Caterpillar | |
| 2017/0370225 A1 | 12/2017 | Itoh et al. | |
| 2018/0112550 A1 * | 4/2018 | Dierksmeier | F01D 11/22 |

* cited by examiner

*Primary Examiner* — Igor Kershteyn
(74) *Attorney, Agent, or Firm* — Procopio, Cory, Hargreaves & Savitch LLP

(57) ABSTRACT

A thermal bridge forms a connection between a cold side and a hot side that is capable of withstanding a large temperature differential while high-pressure gas (e.g., air) flows between the two sides within an internal passageway. A cold-side region and hot-side region of the thermal bridge may each have a flange with a plurality of holes. The cold-side region may also include a conical fillet with counterbore recesses to provide access to each of the plurality of holes from a low radial position.

20 Claims, 11 Drawing Sheets

US 11,174,754 B1

THERMAL BRIDGE FOR CONNECTING SECTIONS WITH A LARGE TEMPERATURE DIFFERENTIAL UNDER HIGH-PRESSURE CONDITIONS

TECHNICAL FIELD

The embodiments described herein are generally directed to a thermal bridge, and, more particularly, to a thermal bridge for connecting sections (e.g., of turbomachinery) that have a large temperature differential while under high-pressure conditions.

BACKGROUND

A turbomachine used for an energy storage solution (e.g., pumped heat electric storage system) comprises a cold compressor section and a hot turbine section. The temperature differential between the cold compressor section and the hot turbine section may be over 1,000° F. Generally, the turbomachine does not have a combustor. Thus, a separate casing part is needed to connect the cold compression section to the hot turbine section.

U.S. Pat. No. 8,347,636 ("the '636 patent") discloses a ceramic matrix composite (CMC) bridge that joins a transition piece with a turbine section of a turbomachine. The CMC bridge in the '636 patent consists of a flexible seal for withstanding high temperatures. This CMC bridge does not employ structural features to reduce thermal stress, arising from differential thermal growth, to allowable levels, provide integrity to the connections, or ensure sound containment and sealing of high-pressure air between the turbomachinery sections.

The present disclosure is directed toward overcoming one or more of the problems discovered by the inventors.

SUMMARY

In an embodiment, a thermal bridge is disclosed for providing a passageway for gas between a cold-side connection housing and a hot-side connection housing, the thermal bridge comprising: a cylindrical body defining a passageway to be used between a cold side and a hot side, wherein the cylindrical body comprises a middle region, a cold-side region extending from a first end of the middle region towards the cold side, wherein the cold-side region comprise a first flange and a conical fillet from an exterior surface of the cylindrical body to the hot side of the first flange, wherein the first flange comprises a plurality of first holes that are parallel to a longitudinal axis of the cylindrical body, and wherein the conical fillet comprises, for each of the plurality of first holes, a counterbore recess that provides access to the first hole from the hot side of the first flange along an axis that is parallel to the longitudinal axis, and a hot-side region extending from a second end of the middle region towards the hot side, wherein the hot-side region comprises a second flange, and wherein the second flange comprises a plurality of second holes that are parallel to the longitudinal axis.

In an embodiment, a machine is disclosed that comprises: a cold-side connection housing; a hot-side connection housing; and the thermal bridge connecting the cold-side connection housing to the hot-side connection housing.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

A turbomachine used for an energy storage solution (e.g., pumped heat electric storage system) comprises a compressor section and a turbine section. For example, the compressor section may comprise a cold compressor, while the turbine section comprises a hot turbine. Alternatively, the compressor section may comprise a hot compressor, while the turbine section comprises a cold turbine. In either case, the temperature differential between the compressor section and the turbine section may be over 1,000° F. Generally, the turbomachine does not have a combustor. Thus, a separate casing part is needed to connect the compression section to the turbine section. Without such a part, the engine will not have the necessary stiffness, and this will negatively impact the engine's operating performance (e.g., clearance, rotor dynamics, efficiency, etc.).

One end of the part will connect to the compressor exit housing of the compressor section, whereas the other end of the part will connect to the turbine inlet housing of the turbine section. Since these two sections operate at two very different temperature levels, the part will be subjected to considerably high thermal stress due to differential thermal growth of the connected structures. In addition, the part will be subjected to high-pressure conditions (e.g., above 300 pounds per square inch absolute (psia)) due to the air exiting the compressor and entering the turbine.

A thermal bridge that is capable of connecting sections with a large temperature differential under high-pressure conditions is disclosed. In one example application, the thermal bridge may be configured to connect a cold compressor section to a hot turbine section or a cold turbine section to a hot compressor section in a turbomachine, despite the large temperature differential between these two sections, and with sufficient sealing capability to contain high-pressure gas (e.g., air) flowing between these two sections.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

Figure 1:
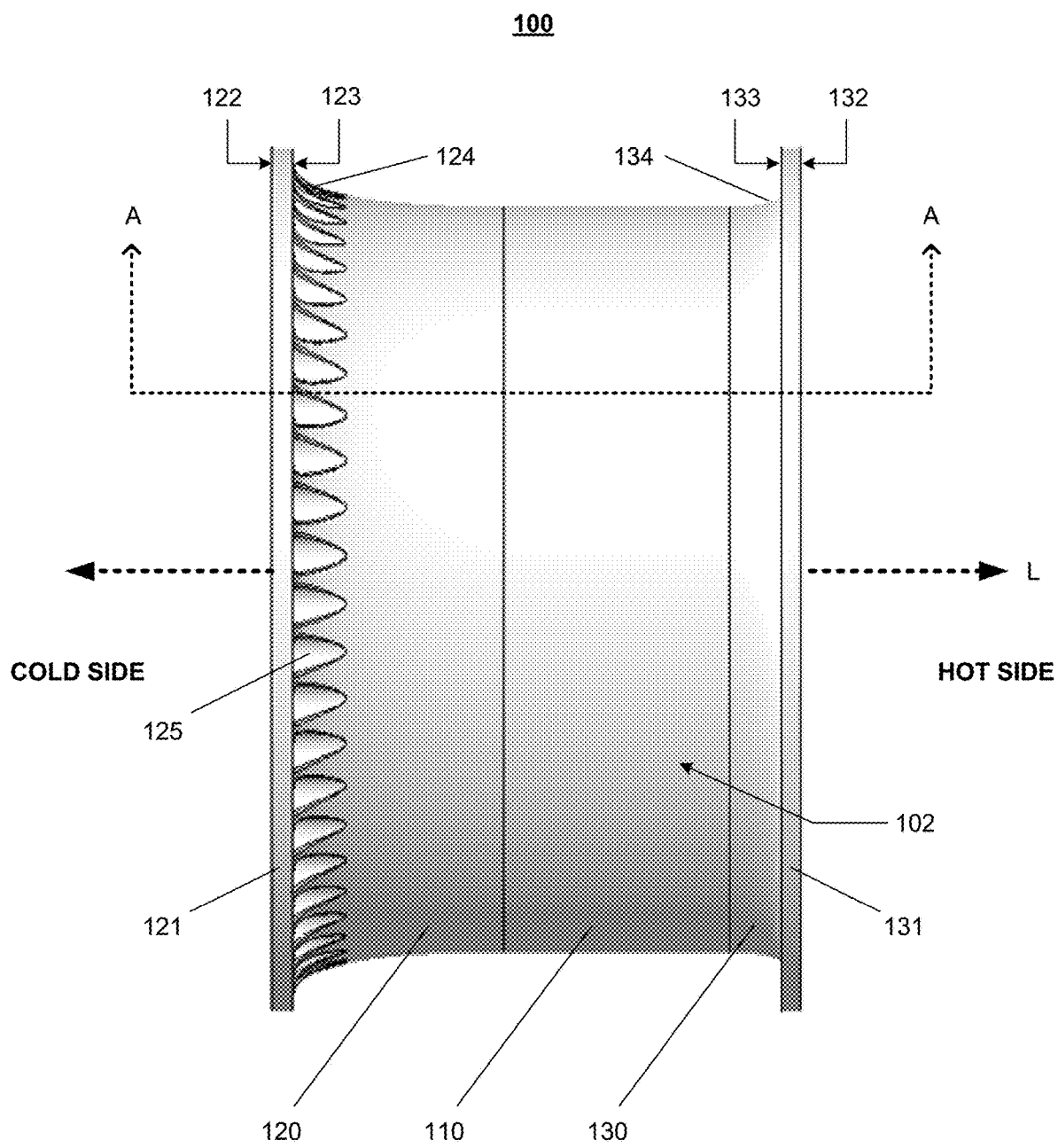
FIG. 1 illustrates a thermal bridge, according to an embodiment.

FIG. 1 illustrates a thermal bridge 100, according to an embodiment. Thermal bridge 100 may be made from any material that is suitable for the application. The material of choice can be dependent on the size of the temperature differential and/or amount of pressure that will be experienced by thermal bridge 100. Generally, the greater the temperature differential and/or pressure, the higher the strength of material that should be used. For example, in a turbomachine with a large temperature differential (e.g., over 500° F.) and high pressure (e.g., over 300 psia), a nickel-based alloy (e.g., Inconel 718) may be used.

As illustrated, thermal bridge 100 comprises a hollow cylindrical middle region 110, a cold-side region 120, and a hot-side region 130. The regions may be manufactured as a single part, or as separate parts that are subsequently joined into a single integrated part. Thermal bridge 100 comprises a hollow cylindrical or substantially cylindrical body with a substantially circular cross section when viewed from the side (i.e., in a plane orthogonal to longitudinal axis L). Thermal bridge 100 provides a passageway, along longitudinal axis L, from an open end of cold-side region 120, through middle region 110, to an open end of hot-side region 130. While the length of middle region 110 is shown as being relatively short, middle region 110 may be any length that is suitable for the application.

Notably, cold-side region 120 is on a first side of thermal bridge 100 that is intended to connect to a cold-side connection housing, whereas hot-side region 130 is on a second side of thermal bridge 100, which is opposite the first side, that is intended to connect to a hot-side connection housing. While the cold side is illustrated on the left and the hot side is illustrated on the right, it should be understood that the sides may be reversed, such that the hot side is on the left and the cold side is on the right. The walls of thermal bridge 100 may be of any thickness, along an axis that is orthogonal to longitudinal axis L, that is suitable for the application. For example, the thickness of an embodiment to be used between a compressor and a hot turbine may be relatively thin (e.g., approximately 0.3 inches). While the thickness of the walls may be substantially uniform through middle region 110, the thickness may gradually increase towards and at one or both ends in cold-side region 120 and hot-side region 130. The thickness may increase along the exterior surface 102 (i.e., away from longitudinal axis) and/or the interior surface (i.e., towards longitudinal axis L) of thermal bridge 100. On exterior surface 102, the increase in thickness may take the form of a conical fillet 124 and/or 134.

As illustrated, cold-side region 120 may comprise a flange 121, having a seal-side surface 122 and an external surface 123, which are both substantially orthogonal to longitudinal axis L. Exterior surface 102 of thermal bridge 100 may form a conical fillet 124 as it approaches external surface 123 of flange 121 102. Conical fillet 124 may comprise a plurality of counterbore recesses 125, at fixed intervals, around the entire exterior periphery of cold-side region 120. In an embodiment, counterbore recesses 125 are located at the junction of flange 121 and conical fillet 124.

As illustrated, hot-side region 130 may also comprise a flange 131, having a seal-side surface 132 and an external surface 133. Exterior surface 102 of thermal bridge 100 may form a conical fillet 134 as it approaches external surface 133 of flange 131. Conical fillet 134 of hot-side region 130 may be identical, similar, or different than conical fillet 124 of cold-side region 120. For example, in the illustrated embodiment, conical fillet 134 has a flatter curvature than conical fillet 124 (e.g., has a shorter arc and does not extend as far along external surface 133 of flange 131 as conical fillet 124 extends along external surface 123 of flange 121). In an alternative embodiment, hot-side region 130 may have no fillet, such that flange 131 adjoins exterior surface 102 of thermal bridge 100 at a substantially right angle.

Figure 2:
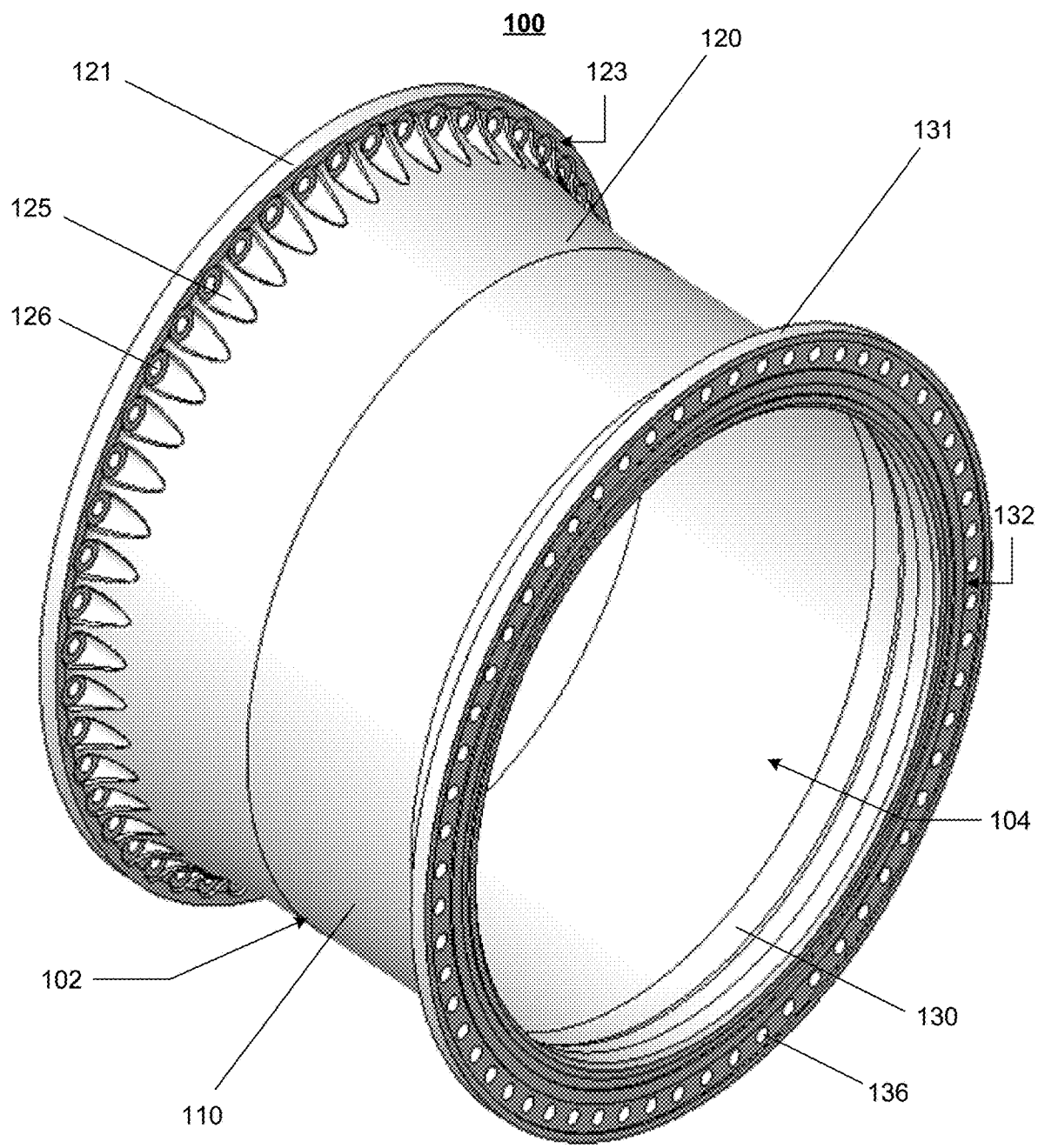
FIGS. 2 and 3 illustrate perspective views of the thermal bridge from the hot side, with and without fasteners, respectively, according to an embodiment.
Figure 3:
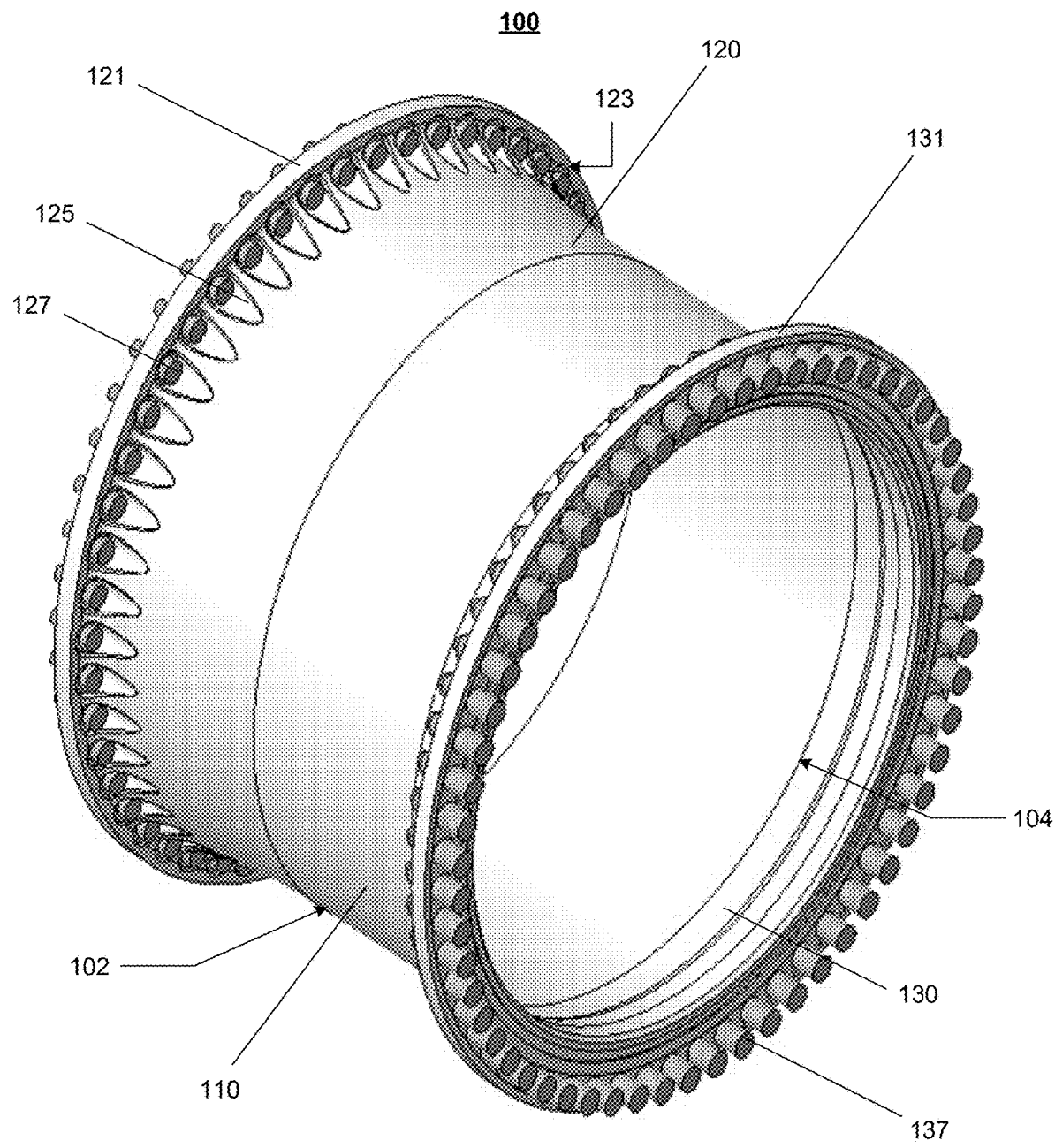
Figure 4:
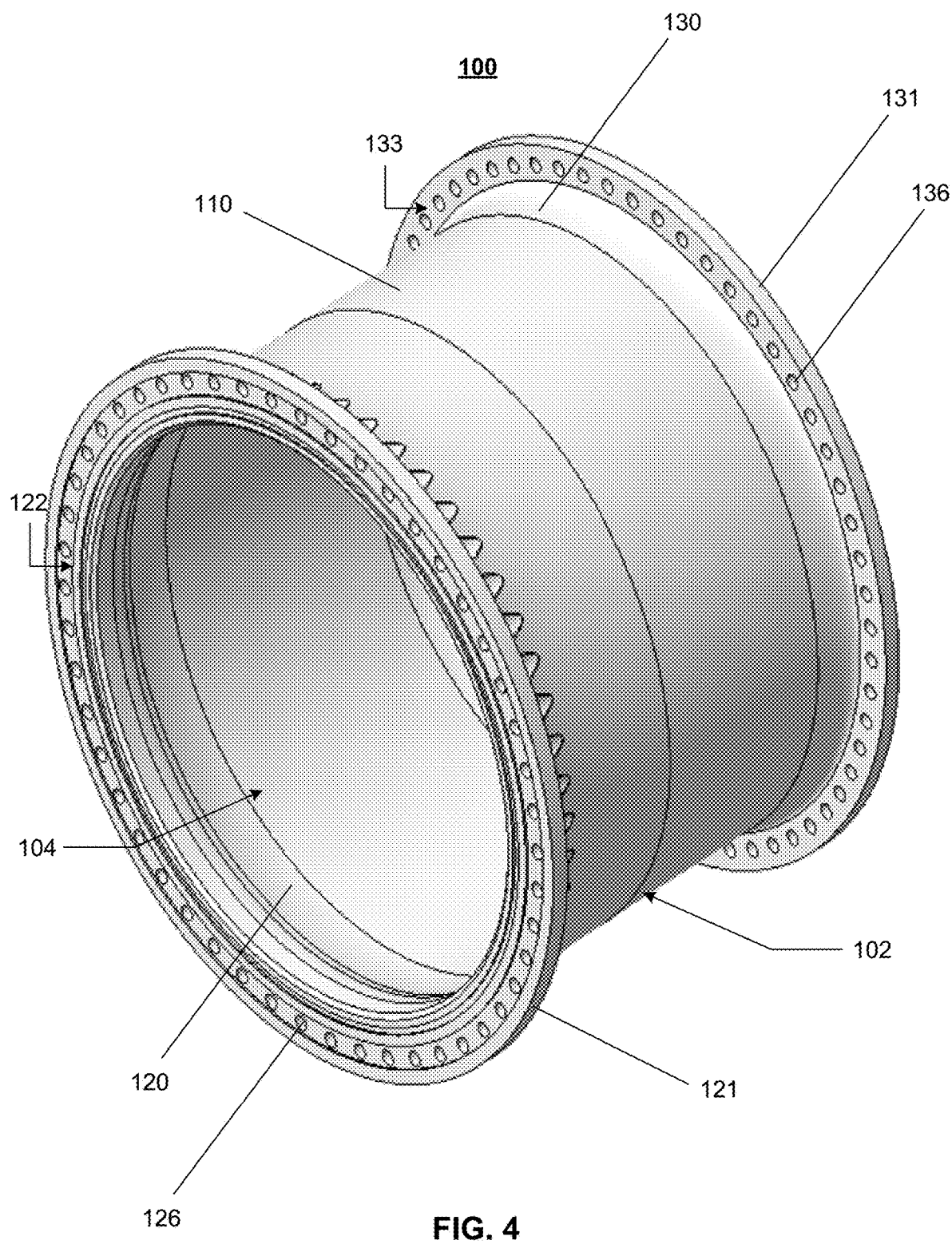
FIGS. 4 and 5 illustrate perspective views of the thermal bridge from the cold side, with and without fasteners, respectively, according to an embodiment.
Figure 5:
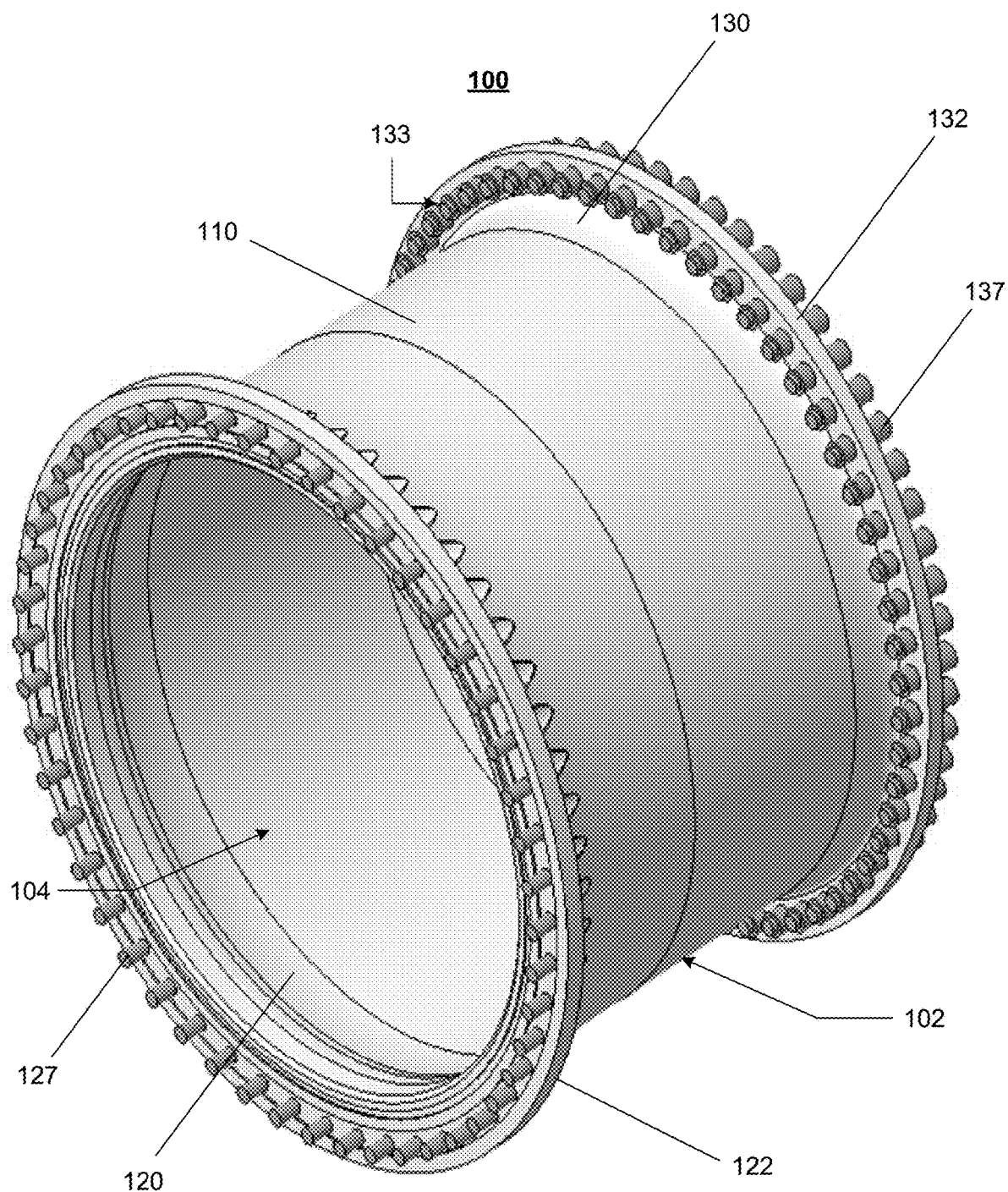

FIGS. 2 and 3 illustrate perspective views of thermal bridge 100 from the hot side, with and without fasteners, respectively, according to an embodiment. Similarly, FIGS. 4 and 5 illustrate perspective views of thermal bridge 100 from the cold side, with and without fasteners, respectively, according to an embodiment. In FIGS. 2-5, an interior surface 104 of thermal bridge 100 is visible.

As illustrated, each counterbore recess 125 provides access to a hole 126 extending through flange 121, including seal-side surface 122 and external surface 123, so that fasteners 127 can be installed in holes 126 at low radial positions. Each hole 126 is substantially parallel to longitudinal axis L. A plurality of such holes 126 are positioned, at fixed intervals, around the entirety of flange 121. Flange 121 may comprise any number of holes 126 that is appropriate for a connection to a cold component (e.g., fifty equidistantly spaced holes 126). Each counterbore recess 125 may have a cross section, when viewed from the side (i.e., in a plane orthogonal to longitudinal axis L), that is an arc of a circle with the same radius or a greater radius than the corresponding hole 126 to which it provides access. Notably, each counterbore recess 125 tapers along an axis that is parallel to longitudinal axis L in accordance with conical fillet 124 of cold-side region 120.

Similarly to flange 121 of cold-side region 120, flange 131 of hot-side region 130 may comprise a plurality of holes 136. Each hole 136 extends through flange 131, including seal-side surface 132 and external surface 133, and is substantially parallel to longitudinal axis L. The plurality of holes 136 may be positioned, at fixed intervals, around the entirety of flange 131. Flange 131 may comprise any number of holes 136 that is appropriate for the connection to a hot component (e.g., fifty equidistantly spaced holes 136). Flange 131 may comprise the same number of holes as flange 121, fewer holes than flange 121, or more holes than flange 121. In an embodiment in which flange 131 comprises the same number of holes 136 as the number of holes 126 in flange 121, each hole 136 in flange 131 may be aligned, along an axis that is parallel to longitudinal axis L, in one-to-one correspondence, with a hole 126 in flange 121.

As illustrated in FIGS. 3 and 5, each hole 126 is configured to receive a fastener 127 therethrough, and each hole 136 is configured to receive a fastener 137 therethrough. In an embodiment, fastener 127 may comprise a bolt, and fastener 137 may comprise a ring-locked stud. However, other types of fasteners may be used for fastener 127 and/or fastener 137, as appropriate for the particular application. Fasteners 127 may be the same type as fasteners 137 or may be a different type from fasteners 137.

Figure 6:
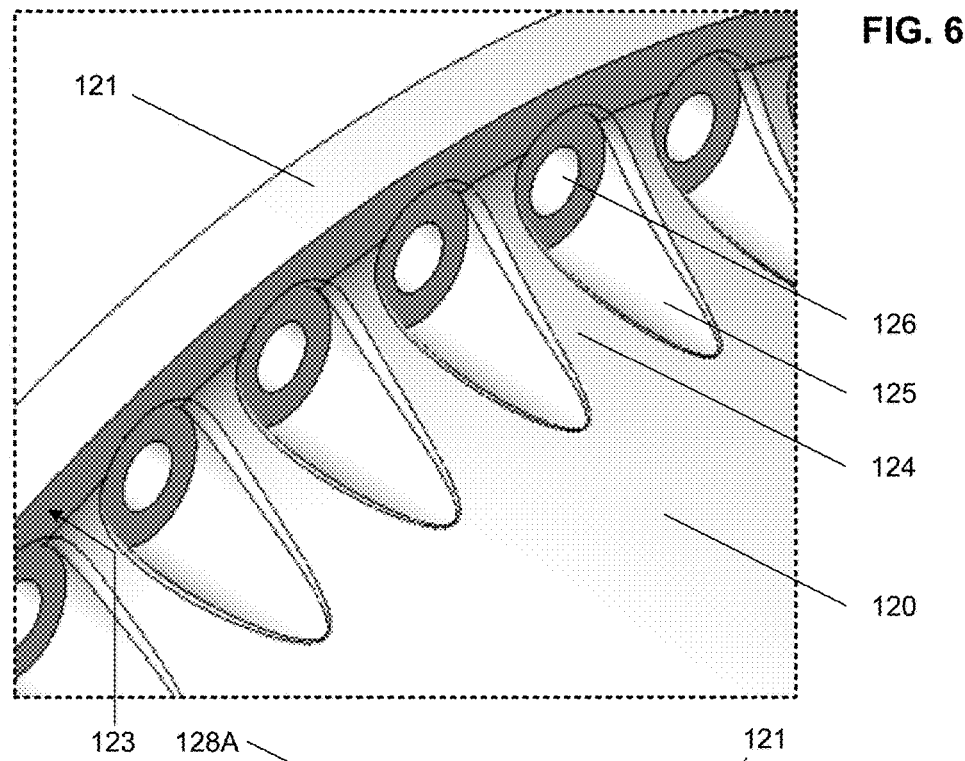
FIGS. 6 and 7 illustrate close-up perspective views of a portion of a cold-side region of the thermal bridge, according to an embodiment.
Figure 7:
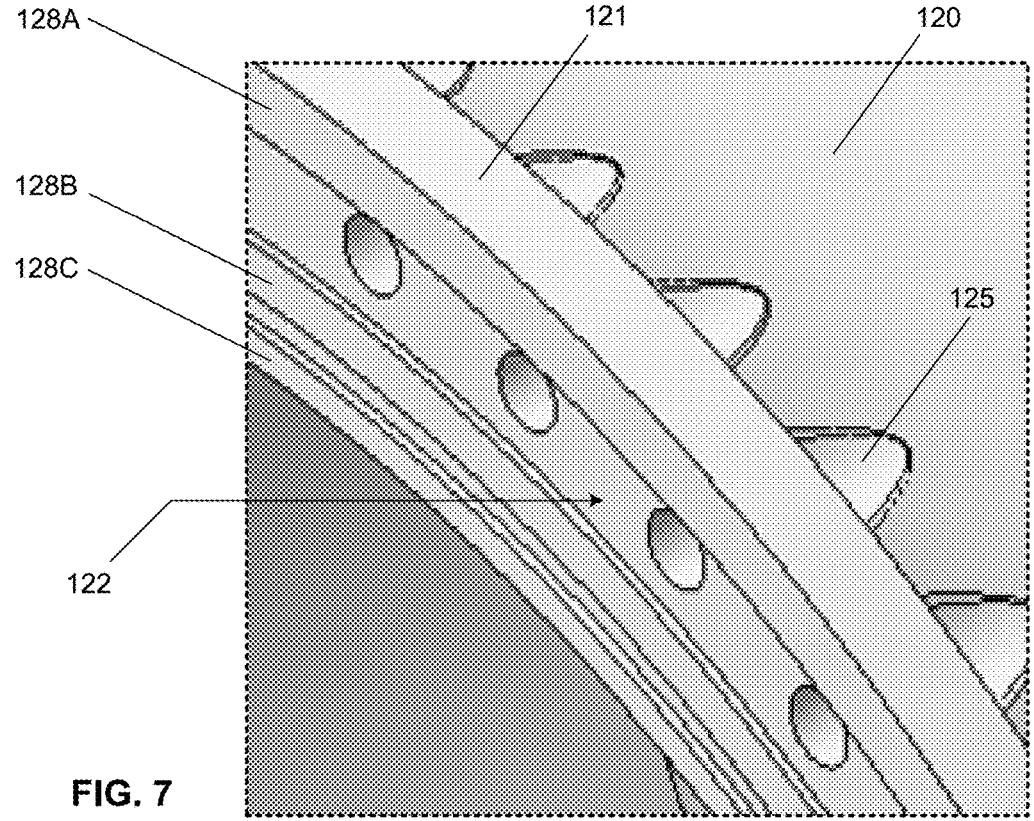
Figure 8:
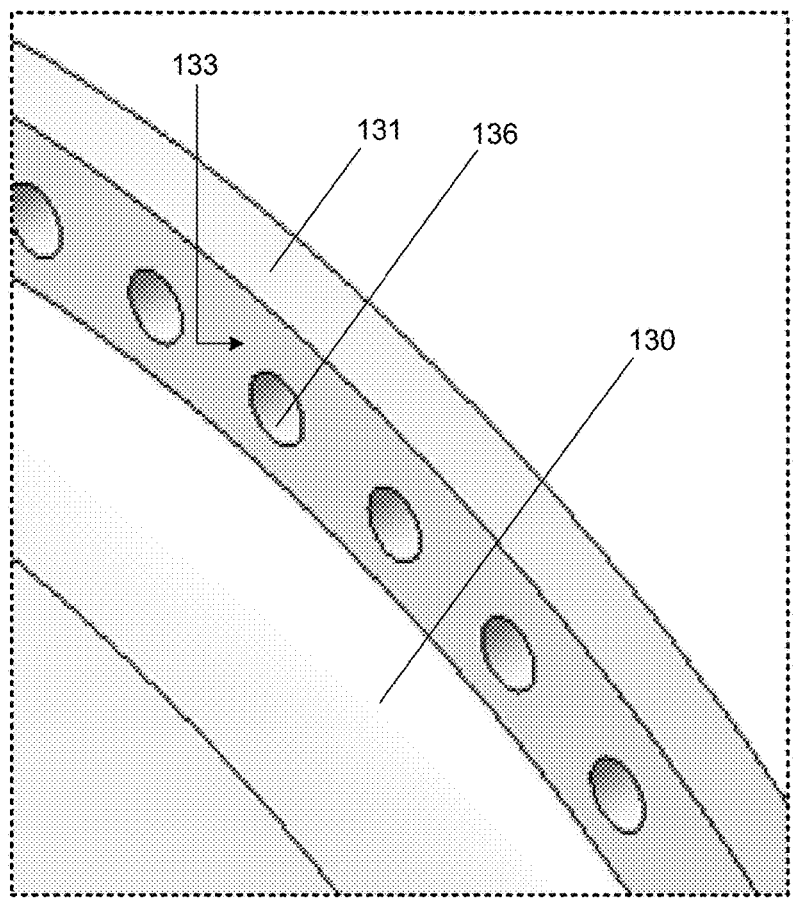
FIGS. 8 and 9 illustrate close-up perspective views of a portion of a hot-side region of the thermal bridge, according to an embodiment.

FIGS. 6 and 7 illustrate close-up perspective views of a portion of cold-side region 120 of thermal bridge 100, from the hot side and cold side, respectively, according to an embodiment. Similarly, FIGS. 8 and 9 illustrate close-up perspective views of a portion of hot-side region 130 of thermal bridge 100, from the cold side and hot side, respectively, according to an embodiment.

As illustrated in FIG. 7, flange 121 may comprise one or more contact sealing lands 128 (e.g., illustrated as 128A, 128B, and 128C) around the entire circular periphery of sealing-side surface 122 of flange 121, thereby encircling the passageway of thermal bridge 100 in an orthogonal view (i.e., orthogonal to longitudinal axis L). Each contact sealing land 128 may be configured to contact the cold-side connection housing at the axial interface, so as to enhance the seal between the exterior environment and the passageway of thermal bridge 100 while gas (e.g., air) flows through the passageway at high pressure. While three contact sealing lands 128 (i.e., 128A-128C) are illustrated in FIG. 7, flange 121 may comprise any number of contact sealing lands 128 (e.g., one, two, four, etc.). In embodiments which comprise a plurality of contact sealing lands 128, the plurality of contact sealing lands 128 may be arranged as concentric circles in the orthogonal view. As illustrated, a first contact sealing land 128A, having the greatest diameter, may be positioned on an outer edge of the cold-side surface of flange 121 so as to encircle holes 126, while a second contact sealing land 128B, concentric with first sealing contact land 128A and having a smaller diameter than first contact sealing land 128A, may be encircled by holes 126. In addition, a third contact sealing land 128C may be positioned on an inner edge of seal-side surface 122 of flange 121, so as to be encircled by both first contact sealing land 128A and second contact sealing land 128B.

Figure 9:
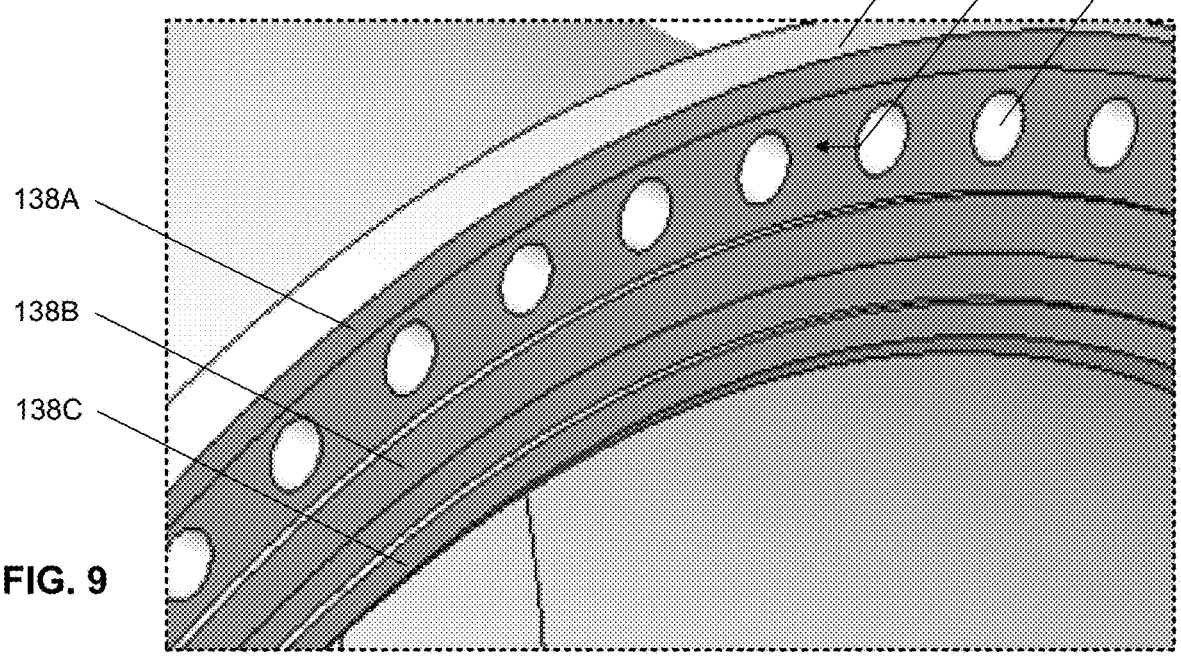

Similarly, as illustrated in FIG. 9, flange 131 may comprise one or more contact sealing lands 138 (e.g., illustrated as 138A, 138B, and 138C) around the entire circular periphery of seal-side surface 132 of flange 131, thereby encircling the passageway of thermal bridge 100 in the orthogonal view (i.e., orthogonal to longitudinal axis L). Each contact sealing land 138 may be configured to contact the hot-side connection housing at the axial interface, so as to enhance the seal between the exterior environment and the passageway of thermal bridge 100 while gas flows through the passageway at high pressure. While three contact sealing lands 138 (i.e., 138A-138C) are illustrated in FIG. 9, flange 131 may comprise any number of contact sealing lands 138 (e.g., one, two, four, etc.). In embodiments which comprise a plurality of contact sealing lands 138, the plurality of contact sealing lands 138 may be arranged as concentric circles in the orthogonal view. As illustrated, a first contact sealing land 138A, having the greatest diameter, may be positioned on an outer edge of seal-side surface 132 of flange 131 so as to encircle holes 136, while a second contact sealing land 138B, concentric with the first contact sealing land 138A and having a smaller diameter than the first contact sealing land 138A, may be encircled by holes 136. In addition, a third contact sealing land 138C may be positioned on an inner edge of seal-side surface 132 of flange 131, so as to be encircled by both first contact sealing land 138A and second contact sealing land 138B.

Figure 10:
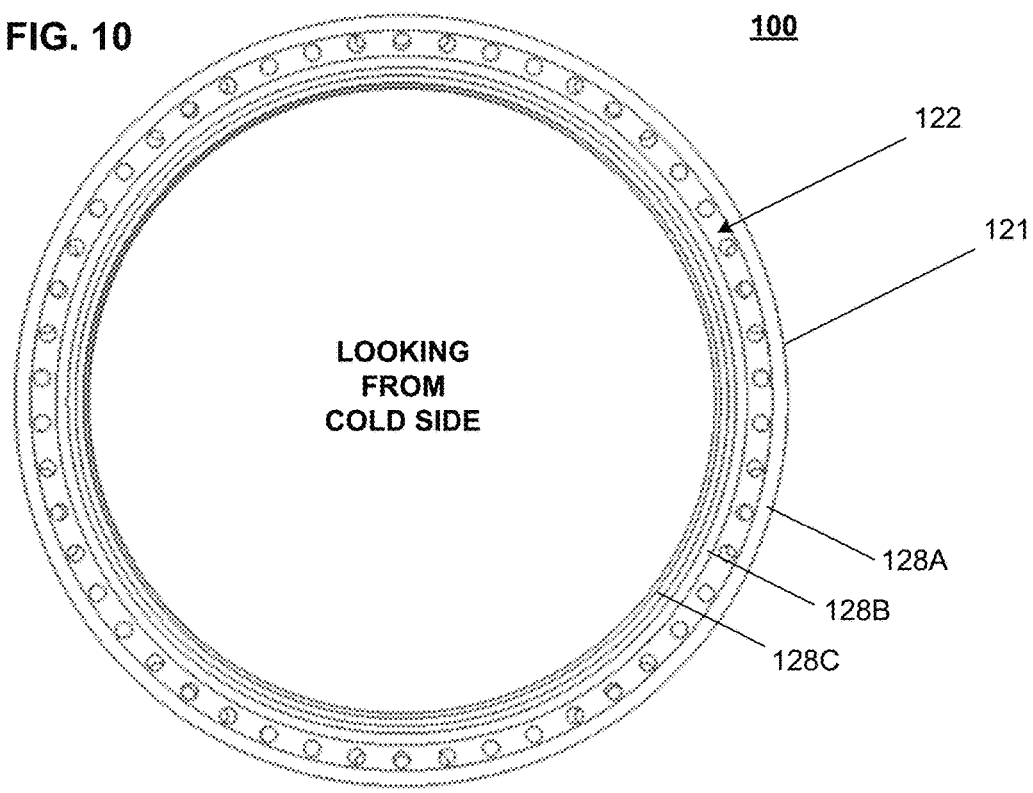
FIGS. 10 and 11 illustrate side views down the longitudinal axis of the thermal bridge from the cold side and the hot side, respectively, according to an embodiment.
Figure 11:
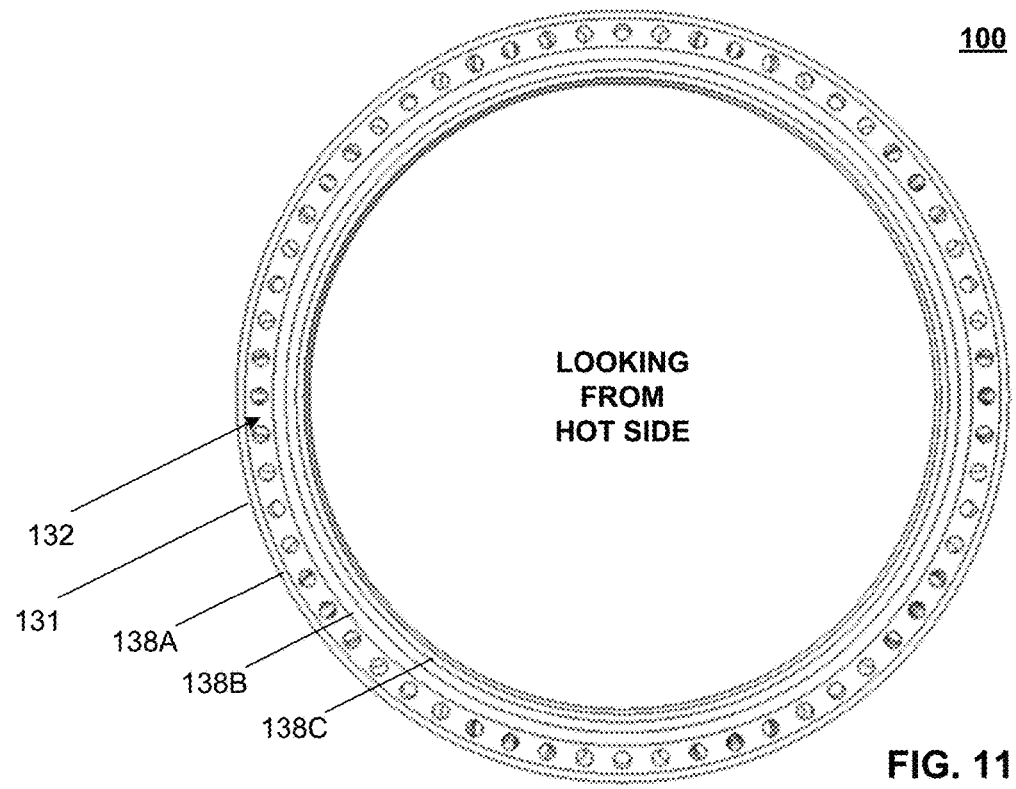

FIGS. 10 and 11 illustrate side views down longitudinal axis L, through the passageway of thermal bridge 100, from the cold side and the hot side, respectively, according to an embodiment. As illustrated, thermal bridge 100 is substantially circular in a cross-sectional plane that is orthogonal to longitudinal axis L, so as to be substantially cylindrical with a passageway from one end to the other end. This passageway enables gas to flow through thermal bridge 100 (e.g., from a cold side to a hot side, or vice versa). Notably, FIGS. 10 and 11 represent orthogonal views (i.e., orthogonal to longitudinal axis L). In the orthogonal views, contact sealing lands 128 are clearly shown encircling the passageway of thermal bridge 100 on seal-side surface 122 of flange 121, and contact sealing lands 138 are clearly shown encircling the passageway of thermal bridge 100 on seal-side surface 132 of flange 131.

Figure 12:
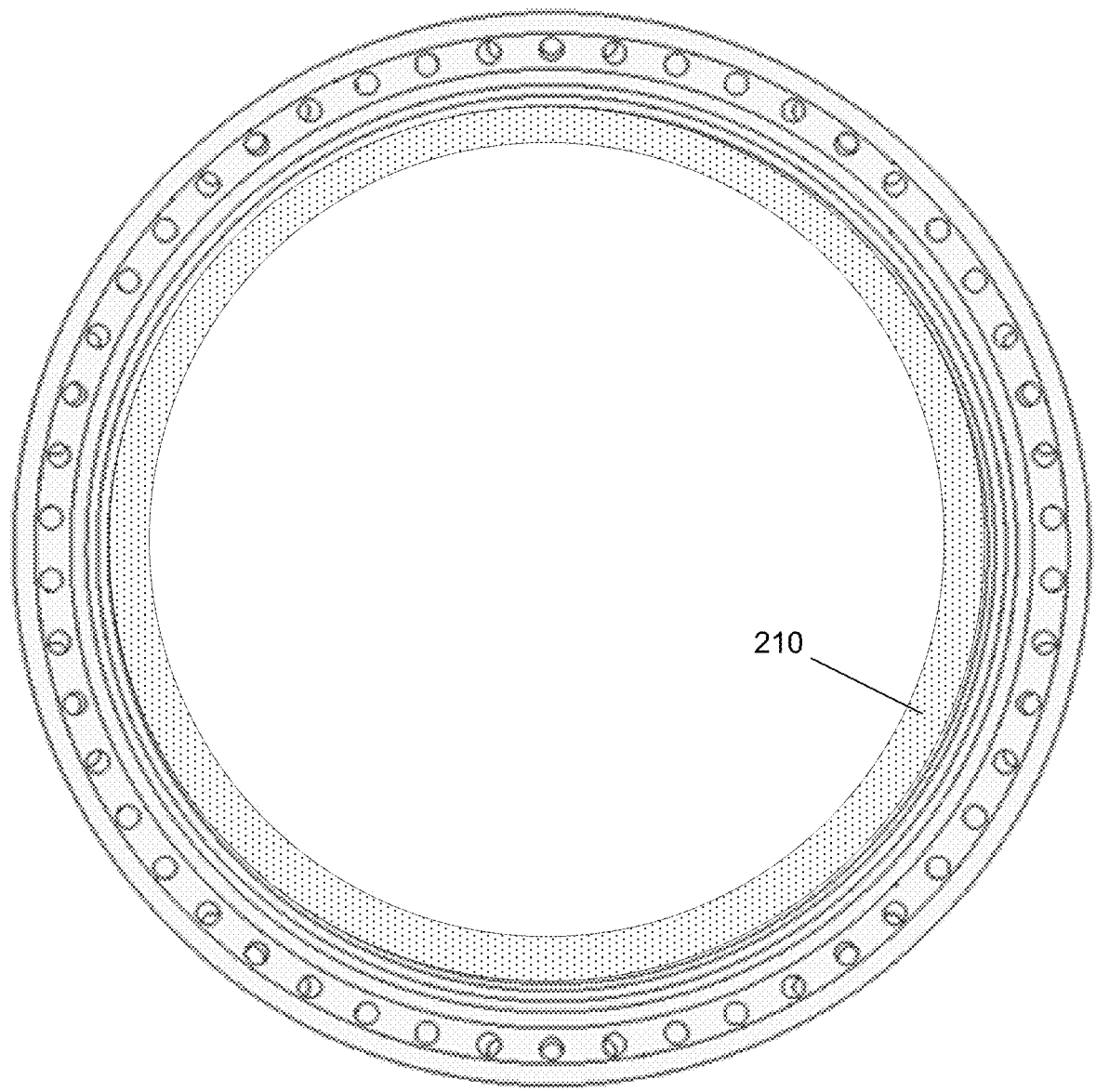
FIG. 12 illustrates the thermal bridge with insulation, according to an embodiment.

FIG. 12 illustrates thermal bridge 100 with insulation 210, according to an embodiment. As illustrated in this orthogonal view, the interior surface of thermal bridge 100 is insulated by insulation 210, which may be substantially formed in the shape of a hollow cylinder with an outer diameter substantially equal to an inner diameter of thermal bridge 100 and a length equal to the length of thermal bridge 100 so as to cover substantially the entire interior surface 104 of the passageway through thermal bridge 100, to thereby insulate the passageway. While the inner diameter of insulation 210 may be substantially uniform along the entire longitudinal axis L from the cold side to the hot side, the outer diameter of insulation 210 may be non-uniform to match any non-uniformity in the inner diameter of the hollow cylindrical body of thermal bridge 100 (e.g., which may flare towards longitudinal axis L approaching both ends of thermal bridge 100). Insulation 210 may be formed of any material and with any thickness that is suitable for the application. Insulation 210 may insulate interior surface 104 of thermal bridge 100, so that heat is transferred from the hot side to the cold side of thermal bridge 100 through conduction only.

INDUSTRIAL APPLICABILITY

Figure 13:
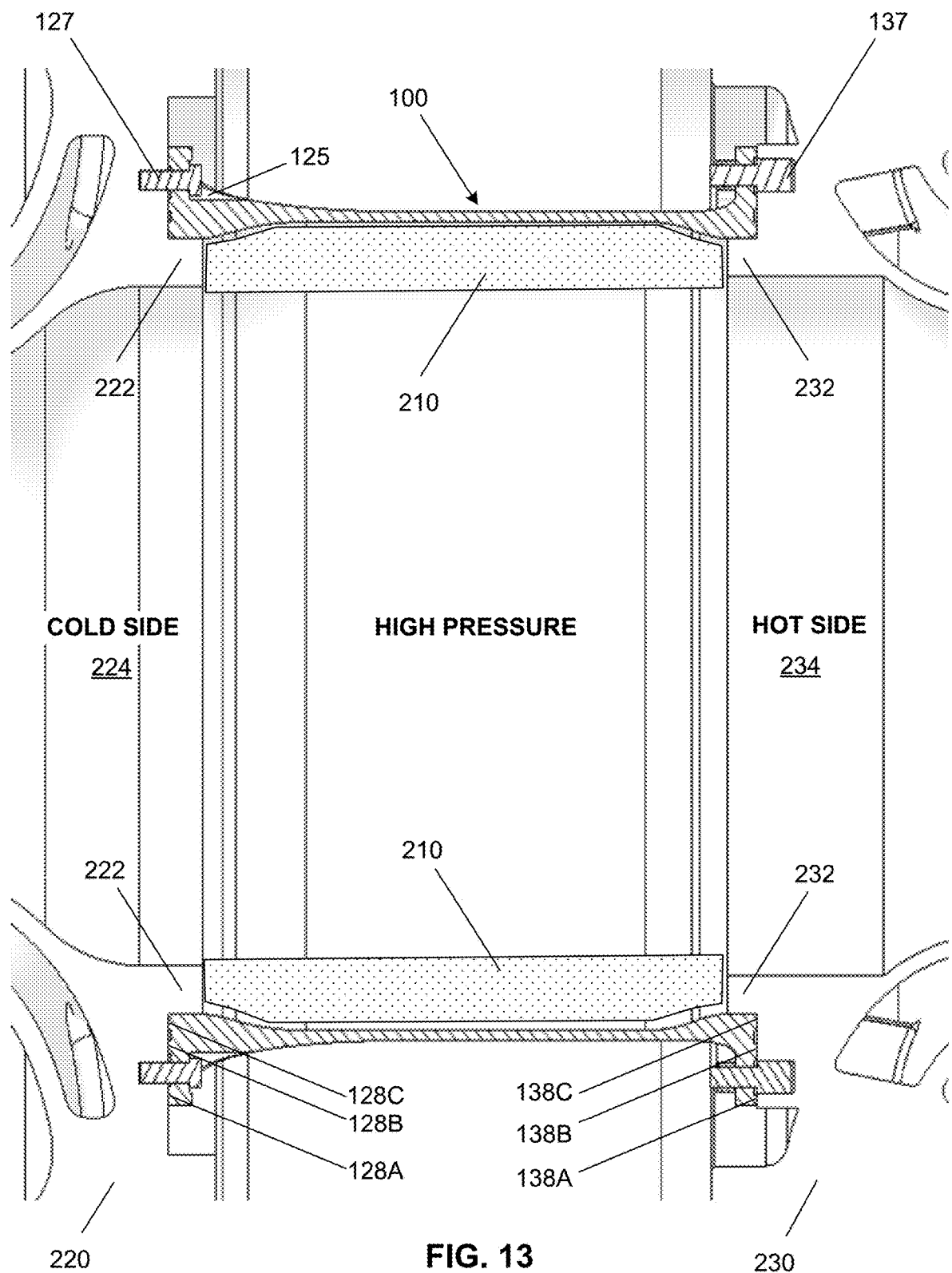
FIG. 13 illustrates a cross-sectional view of the thermal bridge, along line A-A in FIG. 1, within the context of an example turbomachine, according to an embodiment.

FIG. 13 illustrates a cross-sectional view of thermal bridge 100, along line A-A in FIG. 1, in the context of a turbomachine, according to an embodiment. The turbomachine comprises a cold-side connection housing 220 and a hot-side connection housing 230. Cold-side connection housing 220 may comprise an aperture 224 that acts as an outlet for gas exiting, for example, a cold compressor. Hot-side connection housing 230 may comprise an aperture 234 that acts as an inlet for gas entering, for example, a hot turbine. Thus, it should be understood that, in an embodiment, cold-side connection housing 220 represents a compressor and hot-side connection housing 230 represents a turbine. Alternatively, aperture 224 of cold-side connection housing 220 may act as an inlet for gas entering, for example, a cold turbine, and aperture 234 of hot-side connection housing 230 may act as an outlet for gas exiting, for example, a hot compressor. This, it should be understood that, in an alternative embodiment, cold-side connection housing 220 represents a turbine and hot-side connection housing 230 represents a compressor.

Thermal bridge 100 is mounted between cold-side connection housing 220 and hot-side connection housing 230 to connect cold-side connection housing 220 to hot-side connection housing 230, so as to provide a high-pressure passageway for gas flow between cold-side connection housing 220 and hot-side connection housing 230. Specifically, flange 121 of cold-side region 120 of thermal bridge 100 is seated around a support lip 222 encircling an exit of cold-side connection housing 220 in an orthogonal view (i.e., orthogonal to longitudinal axis L), and flange 131 of hot-side region 130 of thermal bridge 100 is seated around a support lip 232 encircling an inlet of hot-side connection housing 230 in the orthogonal view. Interior surface 104 of thermal bridge 100 may be supported by support lips 222 and 232 with an interference fit (also known as a press or friction fit), for example, of approximately 0.006 inches, between the respective support lip and interior surface 104 of the respective region. This reduces peak stress on fasteners 127 and 137, and also serves as the primary seal for high-pressure gas flowing through the passageway of thermal bridge 100. Support lips 222 and 232 may be much thicker than the walls of the hollow cylindrical body of thermal bridge 100.

Once mounted around support lip 222 of cold-side connection housing 220, thermal bridge 100 may be secured to cold-side connection housing 220 using fasteners 127 around the entirety of flange 121. For example, fasteners 127 may comprise bolts that are inserted through holes 126 in flange 121 (e.g., from external surface 123 of flange 121) of cold-side region 120 and mated through corresponding holes in cold-side connection housing 220. Notably, counterbore recesses 125 enable fasteners 127 to be inserted at low radial positions. The bolt pretension should be carefully adjusted to a controlled range to maintain the peak stress of the bolts within the capability of the material of which the bolts are comprised, while keeping the separation between flange 121 and cold-side connection housing 220 within a desired margin (e.g., approximately 0.006 inches or less).

Once mounted around support lip 232 of hot-side connection housing 230, thermal bridge 100 may be secured to hot-side connection housing 230 using fasteners 137 around the entirety of flange 131. For example, fasteners 137 may comprise ring-locked studs and inserts (e.g., Rosan™-brand studs and inserts). Holes 136 of flange 131 may be placed over corresponding studs inserted into hot-side connection housing 230, and then fixed by a ring to those studs. The use of ring-locked studs and inserts may avoid the potential, which a blind-hole bolted connection would present, of galling at high temperatures.

The disclosed structural features of thermal bridge 100 can enable thermal bridge 100 to bear the thermal stress arising from differential thermal growth and maintain the integrity of a bolted flange connection, while ensuring sound containment and sealing of high-pressure gas flowing through thermal bridge 100.

Figure 14:
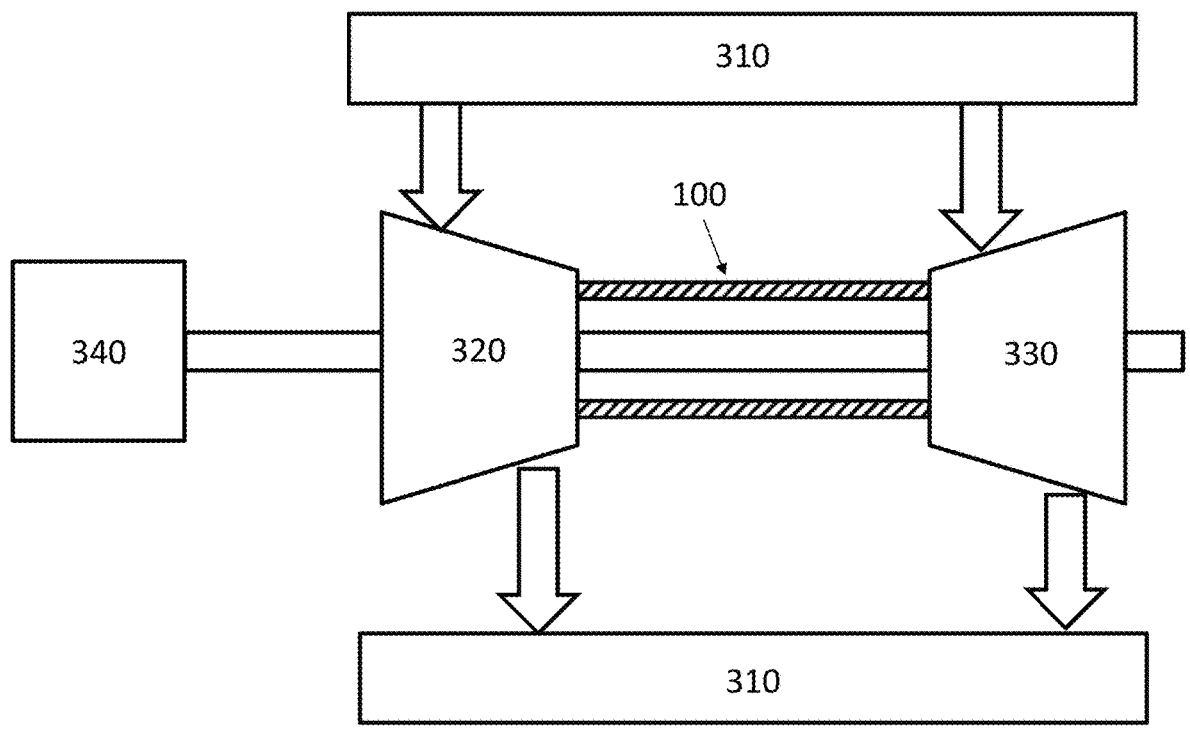
FIG. 14 illustrates an example system in which the thermal bridge may be utilized, according to an embodiment.

FIG. 14 illustrates an example system which utilizes thermal bridge 100, according to an embodiment. As illustrated, system 300 comprises a subsystem 310, a compressor 320, a turbine 330, thermal bridge 100 connecting compressor 320 and turbine 330 (see FIG. 13), and a driven or driving unit 340 that either drives compressor 320 or is driven by turbine 330. Gas (e.g., air) may flow from subsystem 310 into compressor 320 and/or turbine 330, and flows from compressor 320 and/or turbine 330 back into subsystem 310. In an embodiment, system 300 is an energy storage system, such as a pumped heat electric storage system.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of turbomachine. Hence, although the present embodiments are, for convenience of explanation, depicted and described as connecting a compressor section and a turbine section of a turbomachine, it will be appreciated that the disclosed thermal bridge may be used to connect other sections of a turbomachine, as well as to connect sections in various other types of machines, systems, and environments. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A thermal bridge for providing a passageway for gas between a cold-side connection housing and a hot-side connection housing of a turbomachine, the thermal bridge comprising:
  a hollow cylindrical body defining a passageway along a longitudinal axis of the hollow cylindrical body, wherein the cylindrical body comprises
    a middle region,
    a cold-side region extending from a first end of the middle region, wherein the cold-side region comprises a first flange, having a seal-side surface and an external surface opposite the seal-side surface, and a conical fillet from an exterior surface of the hollow cylindrical body to the external surface of the first flange, wherein the first flange comprises a plurality of first holes that are parallel to the longitudinal axis of the hollow cylindrical body, and wherein the conical fillet comprises, for each of the plurality of first holes, a counterbore recess that provides access to the first hole along an axis that is parallel to the longitudinal axis, and
    a hot-side region extending from a second end of the middle region, wherein the hot-side region comprises a second flange, and wherein the second flange comprises a plurality of second holes that are parallel to the longitudinal axis.

2. The thermal bridge of claim 1, wherein the second flange has a seal-side surface and an external surface opposite the seal-side surface, and wherein the hot-side region comprises a conical fillet from the exterior surface of the hollow cylindrical body to the external surface of the second flange.

3. The thermal bridge of claim 1, further comprising insulation positioned between an interior surface of the hollow cylindrical body and the passageway to cover the interior surface of the hollow cylindrical body.

4. The thermal bridge of claim 1, wherein the seal-side surface of the first flange comprises one or more contact sealing lands encircling the passageway.

5. The thermal bridge of claim 4, wherein the one or more contact sealing lands comprise a plurality of concentric contact sealing lands.

6. The thermal bridge of claim 5, wherein a first one of the plurality of concentric sealing lands encircles the plurality of first holes, and wherein a second one of the plurality of concentric contact sealing lands is encircled by the plurality of first holes and the first contact sealing land.

7. The thermal bridge of claim 1, wherein the second flange has a seal-side surface and an external surface opposite the seal-side surface, and wherein the seal-side surface of the second flange comprises one or more contact sealing lands encircling the passageway.

8. The thermal bridge of claim 7, wherein the one or more contact sealing lands comprise a plurality of concentric contact sealing lands.

9. The thermal bridge of claim 8, wherein a first one of the plurality of concentric contact sealing lands encircles the plurality of second holes, and wherein a second one of the plurality of concentric contact sealing lands is encircled by the plurality of second holes and the first contact sealing land.

10. The thermal bridge of claim 1, wherein each of the plurality of first holes is configured to receive a first fastener, and wherein each of the plurality of second holes is configured to receive a second fastener.

11. The thermal bridge of claim 10, wherein the first fastener comprises a bolt.

12. The thermal bridge of claim 11, wherein the second fastener comprises a ring-locked stud.

13. The thermal bridge of claim 1, wherein, in a direction that is orthogonal to the longitudinal axis, a thickness of the cold-side region and a thickness of the hot-side region is greater than a thickness of the middle region.

14. A machine comprising:
a compressor comprising a cold-side connection housing;
a turbine comprising a hot-side connection housing; and
the thermal bridge of claim 1 connecting the cold-side connection housing to the hot-side connection housing.

15. The machine of claim 14, wherein the machine is a turbomachine.

16. The machine of claim 15, wherein the turbomachine is a pumped heat electric storage system.

17. The machine of claim 15, wherein the cold-side connection housing comprises an outlet for gas exiting the compressor, wherein the hot-side connection housing comprises an inlet for gas entering the turbine, and wherein the passageway connects the outlet to the inlet.

18. The machine of claim 17, wherein the cold-side connection housing comprises a first support lip that encircles the outlet in an orthogonal view that is orthogonal to the longitudinal axis, and wherein the first support lip is sized to form an interference fit with an interior surface of the cold-side region.

19. The machine of claim 18, wherein the hot-side connection housing comprises a second support lip that encircles the outlet in the orthogonal view, and wherein the second support lip is sized to form an interference fit with an interior surface of the hot-side region.

20. A thermal bridge for providing a passageway for gas between a cold-side connection housing and a hot-side connection housing of a turbomachine, the thermal bridge comprising:
a hollow cylindrical middle region having a first end and a second end and having a longitudinal axis extending therethrough;
a cold-side region extending from the first end of the middle region, the cold-side region comprising
a first flange having a seal-side surface opposite the hollow cylindrical middle region, a plurality of first holes extending through the first flange and parallel to the longitudinal axis of the hollow cylindrical body, and an external surface opposite the seal-side surface, and
a conical fillet from an exterior surface of the hollow cylindrical middle region to the external surface of the first flange, the conical fillet comprising, for each of the plurality of first holes, a counterbore recess aligned with the first hole along an axis that is parallel to the longitudinal axis; and
a hot-side region extending from a second end of the middle region, wherein the hot-side region comprises a second flange, and wherein the second flange comprises a plurality of second holes that are parallel to the longitudinal axis.

* * * * *